US00RE46596E

(19) United States
(12) Reissued Patent
Peng et al.

(10) Patent Number: US RE46,596 E
(45) Date of Reissued Patent: Oct. 31, 2017

(54) DEVELOPER CARTRIDGE WITH COUNTING MECHANISM

(71) Applicant: Ninestar Corporation, Zhuhai (CN)

(72) Inventors: Qingfei Peng, Zhuhai (CN); Jianxin Cao, Zhuhai (CN)

(73) Assignee: NINESTAR CORPORATION, Zhuhai (CN)

(21) Appl. No.: 15/151,284

(22) Filed: May 10, 2016

Related U.S. Patent Documents

Reissue of:
(64) Patent No.: 9,052,639
Issued: Jun. 9, 2015
Appl. No.: 14/147,018
Filed: Jan. 3, 2014

U.S. Applications:
(63) Continuation of application No. 13/147,777, filed as application No. PCT/CN2010/071430 on Mar. 30, 2010, now Pat. No. 8,655,223.

(30) Foreign Application Priority Data

Aug. 5, 2009 (CN) ..... 2009 1 0109292

(51) Int. Cl.
*G03G 15/08* (2006.01)
*G03G 15/00* (2006.01)

(52) U.S. Cl.
CPC ..... *G03G 15/0896* (2013.01); *G03G 15/55* (2013.01); *G03G 15/553* (2013.01)

(58) Field of Classification Search
CPC ..... G03G 15/0896
USPC ..... 399/12, 119, 106
See application file for complete search history.

(56) References Cited

U.S. PATENT DOCUMENTS 7,418,214 B2 * 8/2008 Yoshida et al. ..... 399/12
2006/0193643 A1 * 8/2006 Takagi et al. ..... 399/12

* cited by examiner

*Primary Examiner* — Beverly M Flanagan
(74) *Attorney, Agent, or Firm* — Annova Law Group PLLC

(57) ABSTRACT

The invention provides a developer cartridge with a counting mechanism. The developer cartridge comprises a developer and the counting mechanism, wherein the counting mechanism is provided with protrusions which come in contact with a contact lever on an electronic photographing device so as to count the developer cartridge; and each protrusion has a first position and a second position in the direction perpendicular to a side wall of the developer cartridge, and is, in the first position, in contact with the contact lever, but is not, in the second position, in contact with the contact lever. The working principle of the developer cartridge adopting the counting mechanism is greatly different from the prior art. Therefore, the structure of the counting mechanism of the developer cartridge is simpler and more convenient and reliable; the production precision and the production cost are reduced; and the market competitiveness of the developer cartridge is improved.

17 Claims, 17 Drawing Sheets

DEVELOPER CARTRIDGE WITH COUNTING MECHANISM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of U.S. application Ser. No. 13/147,777, filed 3 Aug. 2011, which is a US National Stage of International Application No. PCT/CN2010/071430, filed 30 Mar. 2010, which claims the benefit of CN 200910109292.1, filed 5 Aug. 2009, each herein fully incorporated by reference.

BACKGROUND OF THE INVENTION

1. Field of the Invention

The invention relates to a developer cartridge with a counting mechanism.

2. Description of Related Art

The invention relates to a developer cartridge which can be detachably mounted on an electronic photographing device such as a laser printer, a duplicating machine and a facsimile machine, wherein a counting mechanism is arranged on the developer cartridge and can be used with a detector on the electronic photographing device to give instruction of whether the developer cartridge is a new developer cartridge to the electronic photographing device which can then restart calculating the service life of the developer cartridge.

As illustrated in FIGS. 1, 2, and 3, the invention relates to a developer cartridge in the prior art, wherein the developer cartridge adopts a conventional counting mechanism.

A toner hopper 55, a developing component 31, a toner feeding component (not shown), a stirring component (not shown) and a developer (not shown) are arranged on the developer cartridge 28, wherein the developing component 31, the toner feeding component and the stirring component are all fixed on the toner hopper 55; and the developer is stored in the toner hopper 55. During the working process of the developer cartridge, firstly, the developer stored in the toner hopper 55 is stirred and conveyed by the stirring component to the toner feeding component; secondly, the received developer is conveyed to the developing component 31 by the toner feeding component; and finally, a developer layer is formed on the surface of the developing component 31 after the developing component 31 receives the developer from the toner feeding component.

A side wall 58 is arranged on one side of the toner hopper 55, and a developing component gear 69, a toner feeding component gear 68, an input gear 67, an intermediate gear 70 and a stirring component driving gear 71 are all arranged and supported on the side wall 58. During the working process of the developer cartridge, a power receiving part 73 on the input gear 67 receives power from the electronic photographing device and respectively transmits the power to the developing component gear 69, the toner feeding component gear 68 and the intermediate gear 70 which are engaged with the input gear 67; the stirring component driving gear 71 is engaged with the intermediate gear 70 and receives the power from the intermediate gear 70; the developing component gear 69, the toner feeding component gear 68 and the stirring component driving gear 71 are respectively arranged on shafts of the developing component 31, the toner feeding component (not shown) and the stirring component (not shown); and the components are driven to rotate together with the gears which are arranged on the shafts of the components. Therefore, during the working process of the developer cartridge, the developing component 31, the toner feeding component (not shown) and the stirring component (not shown) are driven to rotate in the developer cartridge after the input gear 67 receives the power from the electronic photographing device.

An information detection mechanism 81 and an optical sensor 83 are arranged on the electronic photographing device, wherein the information detection mechanism 81 comprises a rotary shaft 84, a contact lever 86 and a light blocking portion 87; a moving member 178 is arranged on the intermediate gear 70 of the developer cartridge 28 and can rotate around the rotary shaft 79; the moving member 178 and the rotary shaft 79 are arranged on the intermediate gear 70 and can rotate along with the intermediate gear 70; and the side wall 58 is also provided with a blocking protrusion 94 which is motionless relative to the side wall 58.

A counting mechanism in the prior art is composed of the moving member 178 and the blocking protrusion 94 on the developer cartridge 28.

FIG. 1 is a schematic diagram of the developer cartridge 28 on the initial state, in which the contact lever 86 on the information detection mechanism 81 is not in contact with any object (including the moving member 178); the information detection mechanism 81 does not rotate; the light blocking portion 87 is positioned inside the optical sensor 83 as a barrier; and the optical sensor 83 does not send out signals to the electronic photographing device.

As illustrated in FIG. 2, the input gear 67 is engaged with the intermediate gear 70 and transmits the power to the intermediate gear 70 after the power receiving part 73 on the input gear 67 receives the power from the electronic photographing device, and the intermediate gear 70 is driven to rotate; and the moving member 178 is arranged on the intermediate gear 70, so the moving member 178 rotates along with the intermediate gear 70. As the moving member 178 is extended outwardly, the moving member 178 comes in contact with the contact lever 86 in the rotation process and the information detection mechanism 81 is driven to rotate around the rotary shaft 84, herein the light blocking portion 87 after rotation is not positioned inside the optical sensor 83 as a barrier. The optical sensor 83 transmits information to the electronic photographing device after detecting light signals. After the developer cartridge 28 is verified as a new developer cartridge, the electronic photographing device restarts calculating the service life of the developer cartridge, and the counting function of the developer cartridge is realized.

The intermediate gear 70 continues to rotate; the moving member 178 is separated from the contact lever 86; the information detection mechanism 81 is restored to the initial state as shown in FIG. 1 under the action of a restoring force (an elastic restoring force, for example, a spring); the light blocking portion 87 is positioned inside the optical sensor 83 as a barrier; and the electronic photographing device does not receive the information from the optical sensor. As the side wall 58 is provided with the blocking protrusion 94, the moving member 178 comes in contact with the blocking protrusion 94 when the intermediate gear 70 continues to rotate, thus the moving member 178 is driven to rotate around the rotary shaft 79 and is not extended outwardly again when the moving member 178 rotates to the contracted state as illustrated in FIG. 3. As the blocking protrusion 94 is designed into an intermediate supporting shaft 74 which is closer to the intermediate gear 70 than the contact lever 86, the moving member 178 cannot come in contact with the contact lever 86 again when the intermediate gear 70 continues to rotate. Therefore, the optical sensor 83 does not detect the light signals again and the electronic photographing device does not count again as well. The developer cartridge is only counted once during the whole working process.

The counting mechanism adopted in the prior art verifies the developer cartridge as a new developer cartridge by counting the developer cartridge once, and the moving member rotates around the rotary shaft. Therefore, for solving the problem of how to guarantee that the moving member does not rotate around the rotary shaft when in contact with the contact lever but the information detection mechanism is driven to rotate and that the moving member rotates around the rotary shaft when in contact with the blocking protrusion, higher matching precision requirement between the moving member and the rotary shaft is required to meet, thus the production process is difficult to control and the production cost of the developer cartridge is correspondingly increased.

BRIEF SUMMARY OF THE INVENTION

Briefly described, in a preferred form, the present invention comprises a developer cartridge with a counting mechanism to solve the problems of difficult production, high precision, etc. in the prior art.

In order to solve the technical problems, the invention adopts the technical proposal that:

The invention relates to a developer cartridge with a counting mechanism, which comprises a cartridge body for accommodating a developer, the counting mechanism and a counting mechanism driving member, wherein the counting mechanism comprises protrusions which count the developer cartridge by moving from a first position in which the protrusions are in contact with a contact lever on an electronic photographing device to a second position in which the protrusions are not in contact with the contact lever on the electronic photographing device when driven by the counting mechanism driving member. Moreover, the protrusions are driven by the counting mechanism driving member to move in the direction perpendicular to a side wall of the cartridge body.

The counting mechanism driving member comprises an input gear which receives power from the electronic photographing device and a gear which is engaged with the input gear, and drives the protrusions on the counting mechanism to be in rotation movement through power transmission between the input gear and the gear.

A power component is arranged on the counting mechanism.

The counting mechanism comprises a rotary member and a fixed member, wherein the fixed member is fixed on the side wall of the developer cartridge; the rotary member can rotate relative to the developer cartridge; a cylinder is also arranged on the rotary member and comprises a threaded portion an unthreaded portion; the fixed member is provided with a screwed hole corresponding to the cylinder; and the rotary member is provided with the protrusions.

Another aspect of the counting mechanism is that the counting mechanism comprises a rotary member and a fixed member, wherein the fixed member is fixed on the side wall of the developer cartridge; the rotary member can rotate relative to the developer cartridge; the rotary member is provided with a screwed hole and the protrusions; a cylinder corresponding to the screwed hole is arranged on the fixed member; and the cylinder comprises a threaded portion and an unthreaded portion.

The rotary member comprises a first rotary member and a second rotary member, wherein the first rotary member is provided with a concave hole; and a protruded post is arranged on the second rotary member and is used with the concave hole to achieve synchronous rotation between the second rotary member and the first rotary member.

Another aspect of the counting mechanism is that the counting mechanism comprises a rotary member and a fixed member, wherein the rotary member can rotate relative to the developer cartridge; a support pillar is arranged on the rotary member; the fixed member is provided with an opening corresponding to the support pillar; and the rotary member is provided with the protrusions.

A thread pitch or a plurality of thread pitches are arranged on the threaded portion.

A power component is arranged on the rotary member to provide power to the rotary member and to drive the rotary member to rotate.

A hanging wall is arranged on the rotary member, and a gear is arranged on the outer circumference of the hanging wall and engaged with the input gear.

The width of the hanging wall is small enough to make the rotary member stop rotating when the rotary member is in the second position.

The width of the hanging wall is large enough to make the rotary member keep rotating when the rotary member is in the second position.

The counting mechanism also comprises an elastic component which applies an elastic force, for driving the rotary member to move close to the fixed member, to the rotary member.

The fixed member is fixed on the side wall of the developer cartridge.

The fixed member can rotate a certain angle relative to the side wall of the developer cartridge.

The protrusions are truncated cones or inverted truncated cones and come in contact with the contact lever when the rotary member moves close to or away from the side wall of the developer cartridge.

Due to adoption of the technical proposal, the counting mechanism driving member drives the protrusions to move in the direction perpendicular to the side wall of the cartridge body, and the first position and the second position are positioned in different positions at different distance from the side wall of the cartridge body, thus the problems of, not only guaranteeing that the moving member does not rotate around the rotary shaft when in contact with the contact lever but also guaranteeing that the high matching precision requirement on driving the information detection mechanism to rotate is met, in the prior art do not occur. Therefore, the invention solves the problems of difficult production, high precision requirement, etc. in the prior art. The working principle of the technical proposal adopted by the invention is greatly different from that in the prior art. Therefore, the invention has the advantages of making the structure of the counting mechanism of the developer cartridge simpler and more convenient and reliable, reducing the production precision and production cost, and improving the market competitiveness of the developer cartridge.

These and other objects, features and advantages of the present invention will become more apparent upon reading the following specification in conjunction with the accompanying drawing figures.

DETAIL DESCRIPTION OF THE INVENTION

Figure 1:
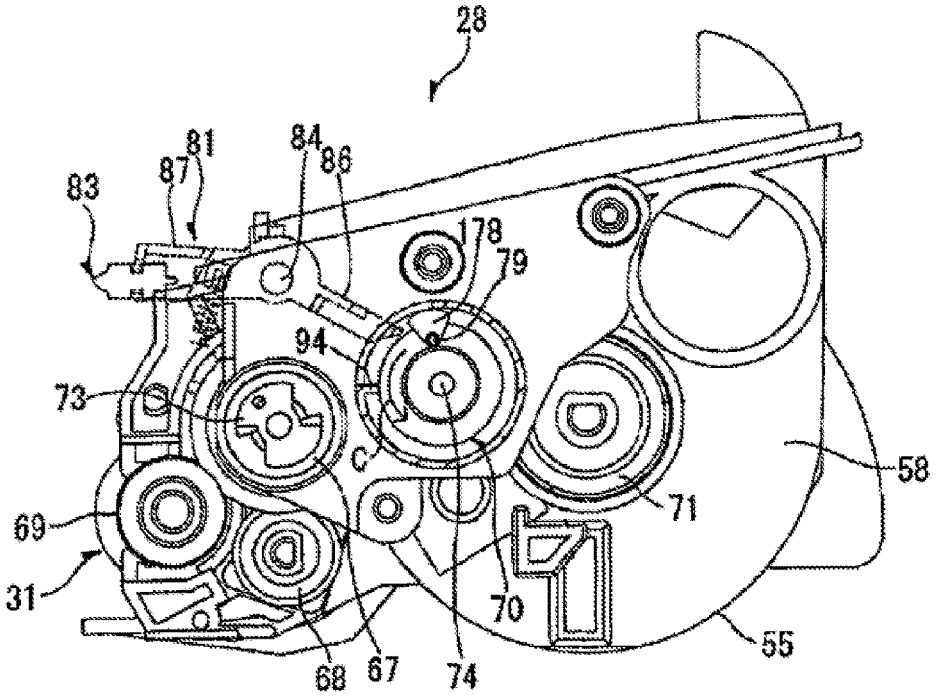
FIG. 1 is a side elevation of a counting mechanism on a developer cartridge in the prior art when the counting mechanism is on the initial state.
Figure 2:
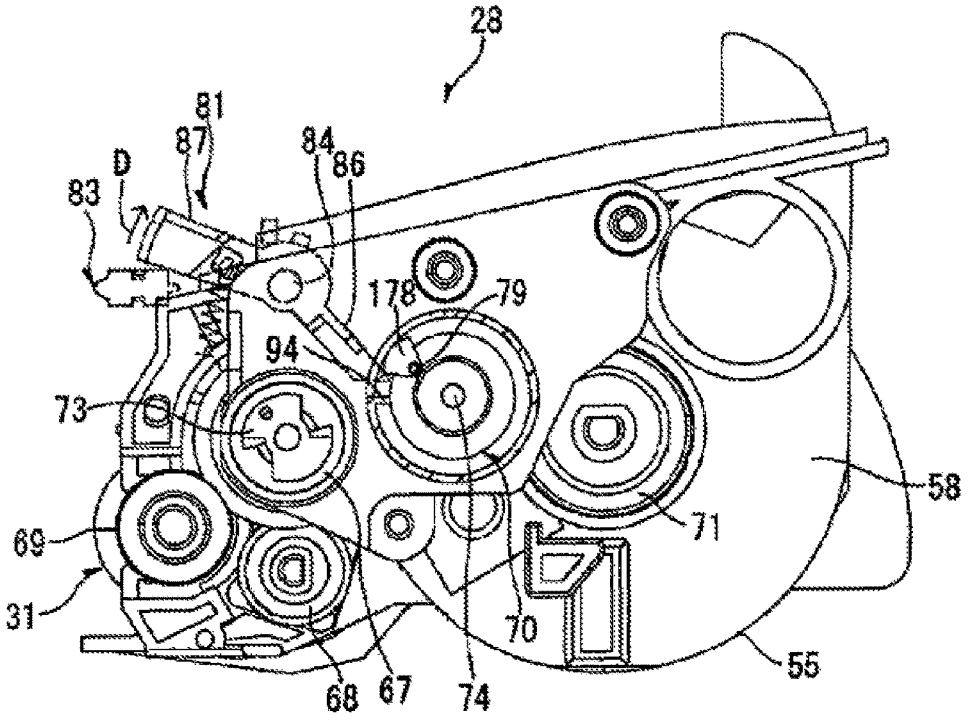
FIG. 2 is a side elevation of the counting mechanism on the developer cartridge in the prior art when the counting mechanism comes in contact with an information detection mechanism under the condition of rotation.
Figure 3:
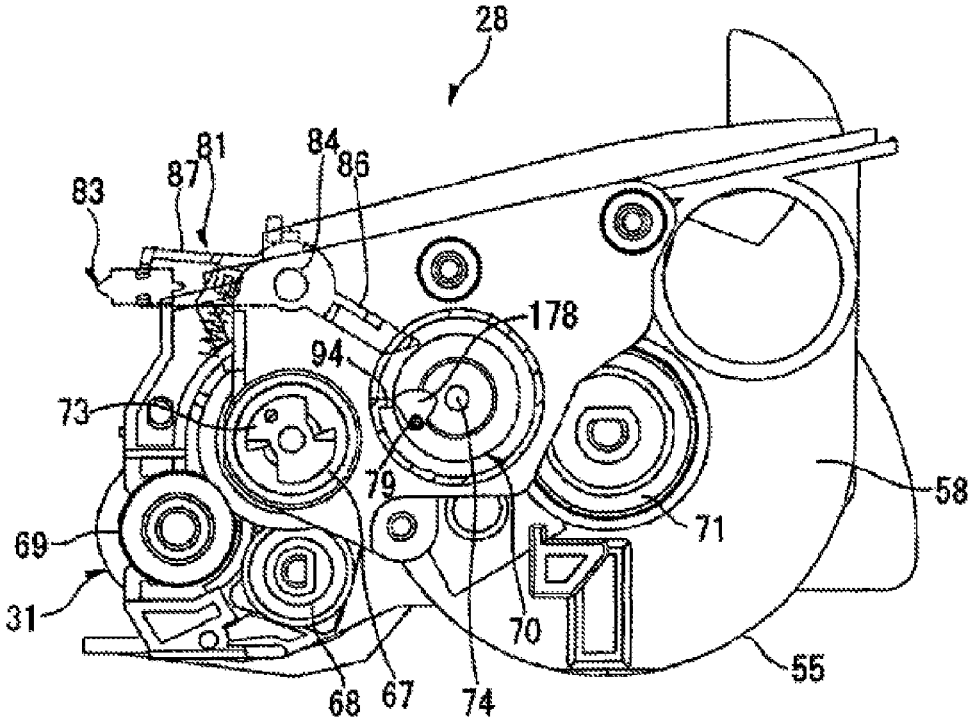
FIG. 3 is a side elevation of the counting mechanism on the developer cartridge in the prior art when a moving member on the counting mechanism is on the contracted state after rotating around a rotary shaft.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Embodiment 1

Unless otherwise specified, the developer cartridge of the embodiment has the same structure with the developer cartridge shown in FIG. 1.

Figure 4:
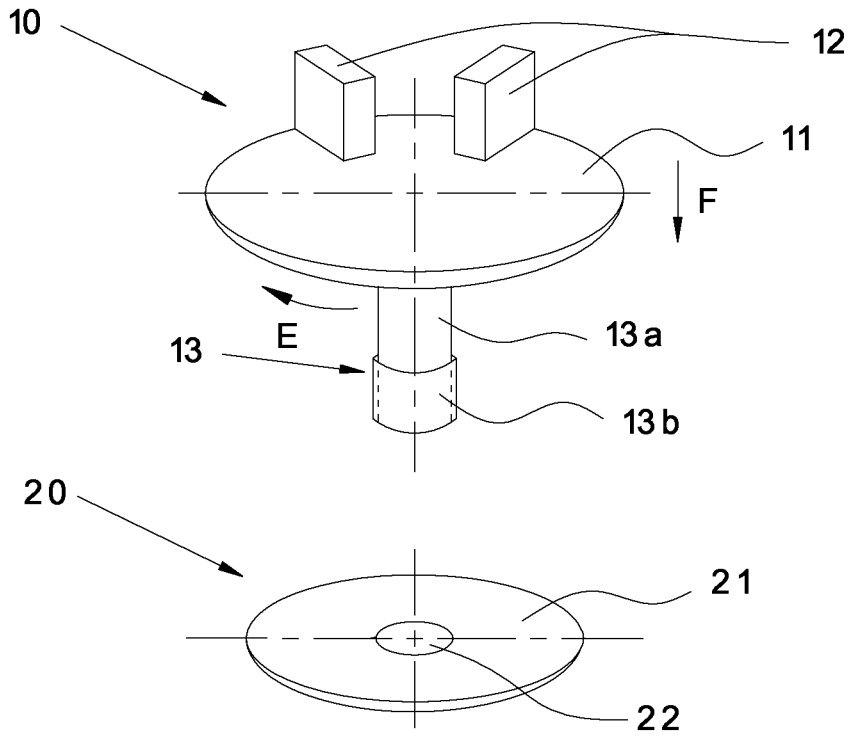
FIG. 4 is structure diagrams of a rotary member and a fixed member in the Embodiment 1.

FIG. 4 is a structure diagram of a counting mechanism in the Embodiment 1. The counting mechanism comprises a rotary member 10 and a fixed member 20, wherein the rotary member 10 is provided with a hanging wall 11, protrusions 12 and a cylinder 13; the cylinder 13 comprises an unthreaded portion 13a and a threaded portion 13b; the fixed member 20 comprises a footwall 21 and a screwed hole 22 corresponding to the threaded portion 13b, is fixed on the side wall 58 of the toner hopper 55 of the developer cartridge as shown in FIG. 1, and is motionless relative to the toner hopper 55; and a gear (not shown in the figure) is arranged on the outer circumference of the hanging wall 11 of the rotary member 10 and engaged with the input gear 67, and receives power from the input gear 67 to drive the rotary member 10 to rotate around a central shaft of the hanging wall 11.

Figure 5:
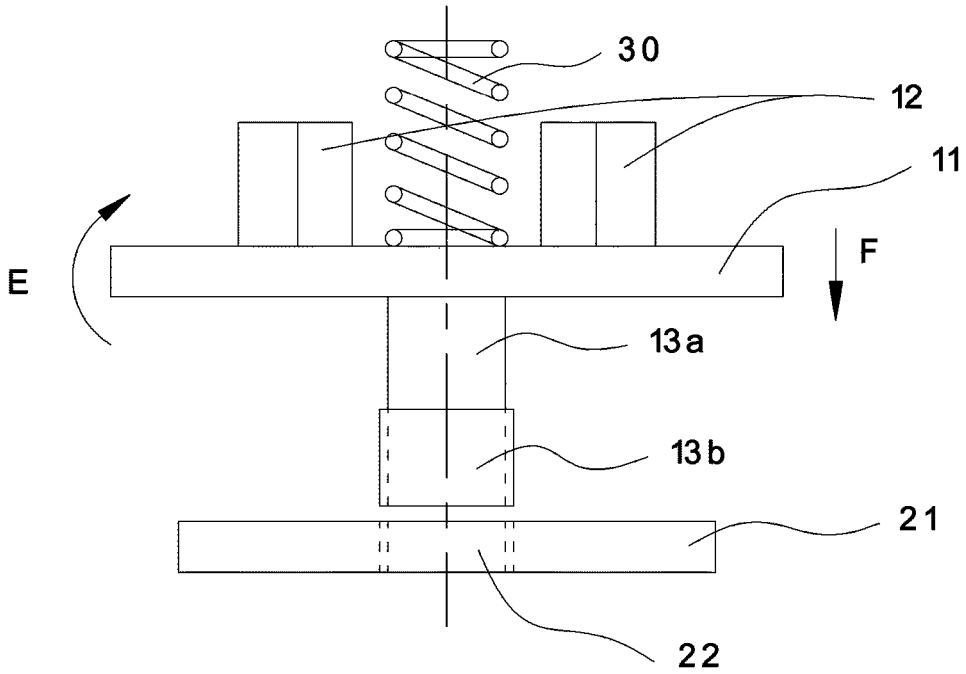
FIG. 5 is a schematic diagram of a counting mechanism on the initial state in the Embodiment 1.

When the counting mechanism is on the initial state, the threaded portion 13b on the rotary member 10 is not engaged with or partially engaged with the screwed hole 22 of the fixed member 20. As shown in FIG. 5, a certain distance is maintained between the hanging wall 11 of the rotary member 10 and the footwall 21 of the fixed member 20; the protrusions 12 of the rotary member 10 are extended outwardly in the direction perpendicular to the side wall 58; and the protrusions 12 are in a first position so as to come in contact with the contact lever 86 on the electronic photographing device when the threaded portion 13b and the screwed hole 22 are engaged with each other, thus the counting function of the developer cartridge 28 is realized.

As the gear on the outer circumference of the hanging wall 11 of the rotary member 10 is engaged with the input gear 67, the threaded portion 13b of the rotary member 10 is engaged with the screwed hole 22 of the fixed member 20 when the hanging wall 11 rotates (along the E direction as shown in FIG. 5) after receiving power from the input gear 67. Due to the thread engagement, a downward acting force F along the axial direction of the cylinder 13 is applied to the threaded portion 13b by the screwed hole 22, and the rotary member 10 is driven to move downward (along the F direction as shown in FIG. 5) to be close to the fixed member 20. As the protrusions 12 are extended outwardly in the direction perpendicular to the side wall 58, the protrusions 12 come in contact with the contact lever 86 when the threaded portion 13b is engaged with the screwed hole 22, thus the counting function is realized.

Figure 6:
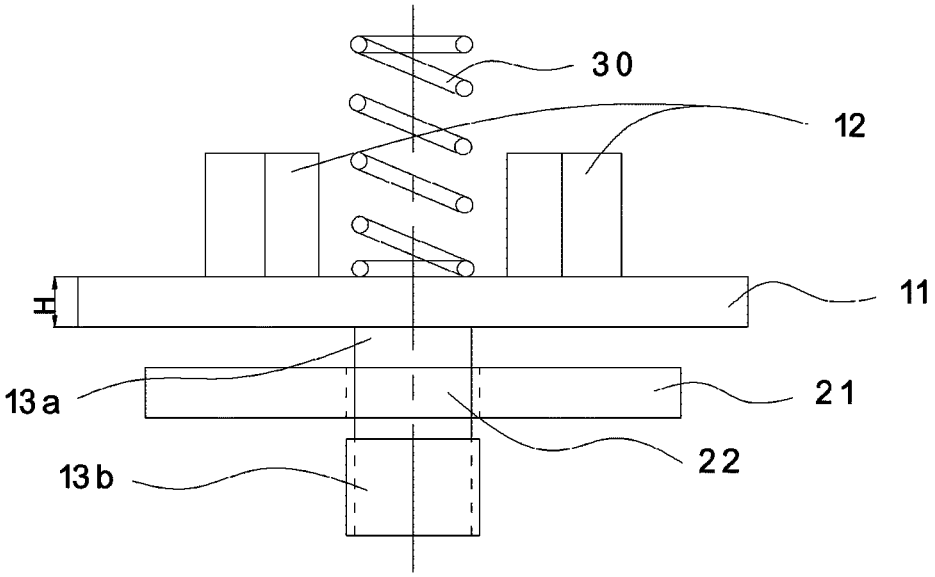
FIG. 6 is a schematic diagram of the counting mechanism on the final state in the Embodiment 1.

When the threaded portion 13b is not engaged with the screwed hole 22 again, the unthreaded portion 13a comes in contact with the screwed hole 22 (the outside diameter of the unthreaded portion 13a is less than that of the threaded portion 13b and less than the inside diameter of the screwed hole 22 as well), and the acting force in the F direction as shown in FIG. 5 is not applied to the rotary member 10 by the screwed hole 22, thus the rotary member 10 does not move downward again. When the rotary member 10 and the fixed member 20 are on the state as shown in FIG. 6, the space between the rotary member 10 and the fixed member 20 is small or the rotary member 10 and the fixed member 20 are adjacent to each other. Herein, the protrusions 12 on the rotary member 2 10 are in the second position in the direction perpendicular to the side wall 58, so the protrusions 12 on the rotary member 10 cannot come in contact with the contact lever 86 again.

In the embodiment, the width of the hanging wall 11 of the rotary member 10 is small, so when the rotary member 10 moves to the state as shown in FIG. 6, the hanging wall 11 of the rotary member 10 is not engaged with the input gear 67 again; the rotary member 10 does not rotate; the protrusions 12 are not in contact with the contact lever 86; and the counting function of the developer cartridge 28 does not work.

In the embodiment, as a thread pitch is arranged on the threaded portion 13b, the screwed hole 22 is engaged with the unthreaded portion 13a after the one-turn engagement with the threaded portion 13b; the protrusions 12 are only subjected to one rotation along with the rotary member 10; and each protrusion 12 only comes in contact with the contact lever 86 once before rotating from the first position to the second position.

Another aspect of the embodiment is that two or more than two thread pitches are arranged on the threaded portion 13b, thus the screwed hole 22 is engaged with the unthreaded portion 13a after the engagement with the threaded portion 13b for two turns or more than two turns; the protrusions 12 are subject to two rotations or more than two rotations along with the rotary member 10; and each protrusion 12 comes in contact with the contact lever 86 twice or more than twice before rotating from the first position to the second position.

Another aspect of the embodiment is that the width H of the hanging wall 11 of the rotary member 10 or the width of the input gear 67 can be set to be large enough to drive the rotary member 10 to be always engaged with the input gear 67 during the downward movement. Moreover, when the rotary member 10 is on the state as shown in FIG. 6, the gear on the outer circumference of the hanging wall 11 is still engaged with the input gear 67 when the threaded portion 13b is not engaged with the screwed hole 22, and the rotary member 10 still rotates, namely the rotary member 10 always rotates during the whole working process of the developer cartridge 28.

Another aspect of the embodiment is that a gear is not arranged on the rotary member 10 to be engaged with the input gear 67, and a power component is arranged on the rotary member 10 to drive the rotary member 10 to rotate. For example, a torsion spring is arranged on the rotary member 10 to provide power to the rotary member 10.

In the embodiment, the elastic component 30 in contact with the rotary member 10 is also adopted, wherein a downward acting force along the direction as shown in FIG. 5 is applied to the rotary member 10 by the elastic component to help the threaded portion 13b of the rotary member 10 be in better engagement with the screwed hole 22 of the fixed member 20.

Embodiment 2

Figure 7:
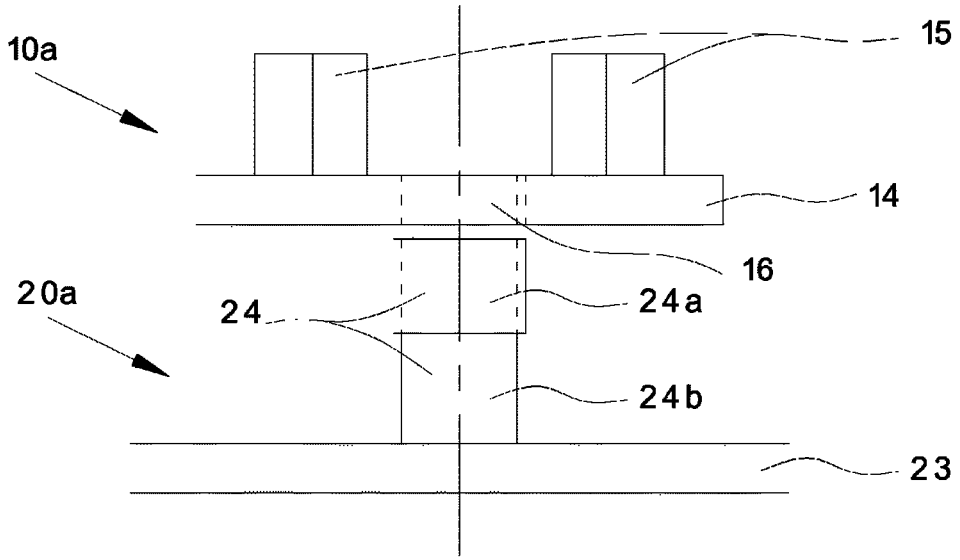
FIG. 7 is a schematic diagram of a counting mechanism on the initial state in the Embodiment 2.
Figure 8:
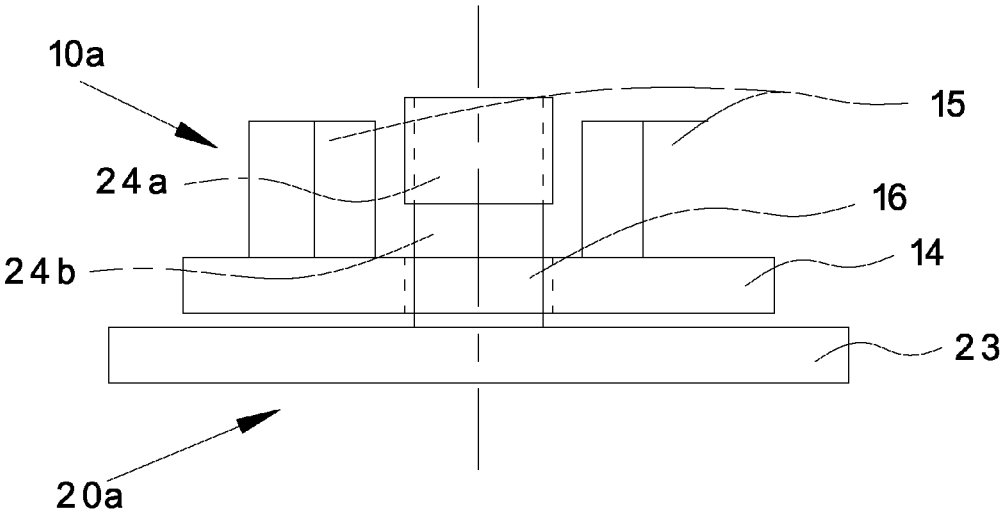
FIG. 8 is a schematic diagram of the counting mechanism on the final state in the Embodiment 2.

The FIGS. 7 and 8 illustrate the Embodiment 2. Unless otherwise specified, the developer cartridge of the embodiment has the same structure with the developer cartridge of the Embodiment 1.

The counting mechanism of the embodiment comprises a rotary member 10a and a fixed member 20a, wherein the rotary member 10a is provided with a hanging wall 14, protrusions 15 and a screwed hole 16; a footwall 23 and a cylinder 24 are arranged on the fixed member 20a; the cylinder 24 comprises a threaded portion 24a and an unthreaded portion 24b; a gear is arranged on the outer circumference of the hanging wall 14 of the rotary member 10a and engaged with the input gear 67; and the fixed member 20a is arranged on the side wall 58 of the toner hopper 55 and is motionless relative to the toner hopper 55.

FIG. 7 is a schematic diagram of the counting mechanism of the embodiment on the initial state. Herein the protrusions 15 on the rotary member 10a are extended out of the side wall 58 and can come in contact with the contact lever 86 on the electronic photographing device when the threaded portion 24a is engaged with the screwed hole 16, thereby the counting function of the developer cartridge is realized.

FIG. 8 is a schematic diagram of the counting mechanism of the embodiment on the final state. Herein the threaded portion 24a is not engaged with the screwed hole 16 which rotates around the unthreaded portion 24b, and the protrusions 15 are not extended out of the side wall 58 and are not in contact with the contact lever on the electronic photographing device, thereby the counting function of the developer cartridge does not work.

It is obvious to those having ordinary skill in the art that the working process and working principle of the counting mechanism of the embodiment are the same with those of the Embodiment 1; and no further detailed description is given herein.

Embodiment 3

Unless otherwise specified, the developer cartridge of the embodiment has the same structure with the developer cartridge shown in FIG. 1.

Figure 9:
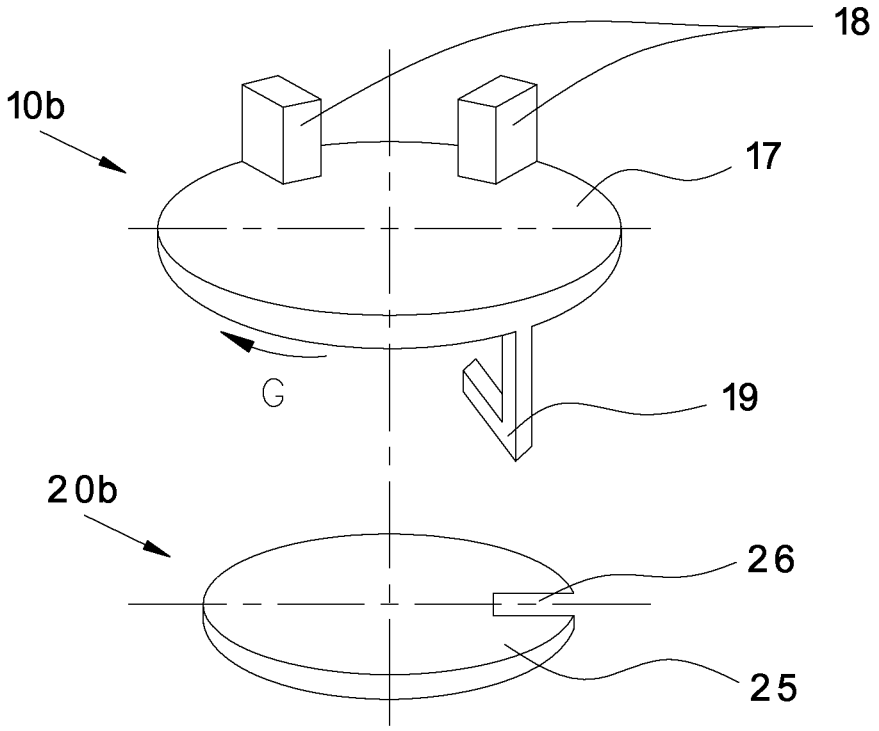
FIGS. 9 and 10 are schematic diagrams of a counting mechanism on the initial state in the Embodiment 3.

As illustrated in FIG. 9, the counting mechanism of the embodiment comprises a rotary member 10b and a fixed member 20b, wherein the rotary member 10b comprises a hanging wall 17, protrusions 18 and a support pillar 19; the fixed member 20b comprises a footwall 25 and an opening 26, is fixed on the side wall 58 of the toner hopper 55, and is motionless relative to the developer cartridge 28; a gear is arranged on the outer circumference of the hanging wall 17 of the rotary member 10b and engaged with the input gear 67 of the developer cartridge; and the rotary member 10b can rotate clockwise around the center of the hanging wall 17 (along the G direction as shown in FIG. 9).

Figure 10:
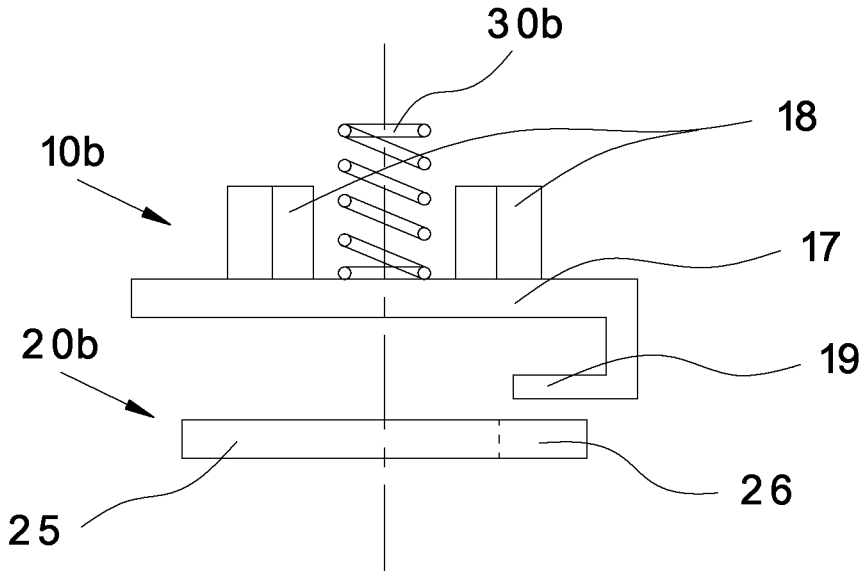

FIGS. 9 and 10 are schematic diagrams of the counting mechanism of the embodiment on the initial state. When the counting mechanism is on the state, the protrusions 18 on the rotary member 10b are in the first position in the direction perpendicular to the side wall 58. As the protrusions 18 on the rotary member 10b are extended outwardly in the direction perpendicular to the side wall 58, the protrusions 18 come in contact with the contact lever 86 on the electronic photographing device in the rotation process, thus the counting function of the developer cartridge is realized.

When the counting mechanism is on the initial state, a certain angle is formed between the support pillar 19 on the rotary member 10b and the opening 26 on the fixed member 20b in a staggered manner, and a certain distance is maintained between the hanging wall 17 of the rotary member 10b and the footwall 25 of the fixed member 20b, as shown in FIG. 10. Therefore, guarantee can be made that the protrusions 18 on the rotary member 10b come in contact with the contact lever 86 in the rotation process of the rotary member 10b.

Figure 11:
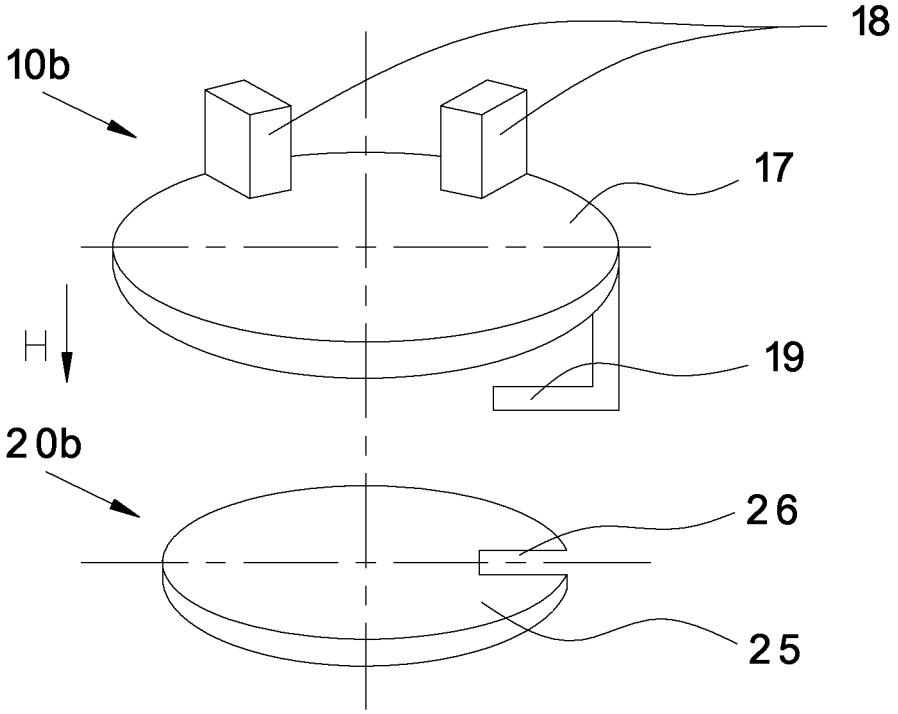
FIGS. 11 and 12 are schematic diagrams of the counting mechanism on the final state in the Embodiment 3.
Figure 12:
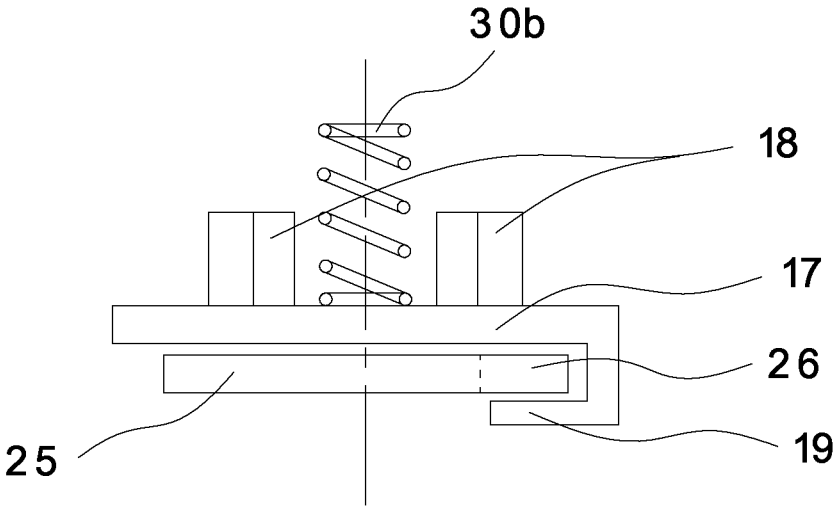

When the rotary member 10b rotates a certain angle (less than or equal to 360°) along the rotation direction as shown in FIGS. 9 and 10, the rotary member 10b is on the final state as shown in FIGS. 11 and 12. When the rotary member 10b is on the state, the support pillar 19 on the rotary member 10b is over against the opening 26 on the fixed member 20b. Because the support pillar 19 is smaller than the opening 26, the rotary member 10b moves closer to the fixed member 20b (in the H direction as shown in FIG. 11) under the action of an elastic force applied by the elastic component 30b; the protrusions 18 on the rotary member 10b move closer to the side wall 58; the hanging wall 17 of the rotary member 10b and the footwall 25 of the fixed member 20b are adjacent to each other; and the protrusions 18 are in the second position in the direction perpendicular to the side wall 58 and cannot come in contact with the contact lever 86 on the electronic photographing device again, thus the counting function of the developer cartridge does not work.

In the embodiment, the width of the gear on the outer circumference of the hanging wall 17 of the rotary member 10b is very small, so the gear on the outer circumference of the hanging wall 17 is not engaged with the input gear 67 again after the rotary member 10b is close to the fixed member 20b (on the state as shown in FIGS. 11 and 12), thus the rotary member 10b does not rotate again.

Another aspect of the embodiment is that the width of the gear on the outer circumference of the hanging wall 17 can be set to be large enough so that the gear on the outer circumference of the hanging wall 17 can still be engaged with the input gear 67 after the rotary member is on the state shown in FIGS. 11 and 12. The rotary member 10b still rotates on the state shown in FIGS. 11 and 12.

Another aspect of the embodiment is that a gear is not arranged on the rotary member 10b to be engaged with the input gear 67, and a power component is arranged on the rotary member 10b to provide power to the rotary member 10b and to drive the rotary member 10b to rotate. For example, a torsion spring is arranged on the rotary member 10b to provide power to the rotary member 10b.

Another aspect of the embodiment is that the fixed member 10b is arranged on the side wall 58 of the developer cartridge and can rotate a certain angle (such as 60 DEG, 90 DEG, etc.) relative to the side wall 58, and the support pillar 19 is over against the opening 26 after driven to rotate a larger angle (more than 360°).

Embodiment 4

Unless otherwise specified, the developer cartridge of the embodiment has the same structure with the developer cartridge of the Embodiment 3.

In the embodiment, the rotary member 10b is fixed on the side wall 58 of the toner hopper 55 and is motionless relative to the side wall 58; the fixed member 20b can rotate relative to the developer cartridge 28; the fixed member 20b is provided with the protrusions 18 which rotate along with the fixed member 20b; the hanging wall 17 and the support pillar 19 are arranged on the rotary member 10b; the fixed member 20b is also provided with the footwall 25 and the opening 26; a gear is arranged on the outer circumference of the footwall 25 of the fixed member 20b and engaged with the input gear 67; and the protrusions 18 come in contact with the contact lever 86 in the rotation process, thus the counting function of the developer cartridge is realized.

Embodiment 5

Unless otherwise specified, the developer cartridge of the embodiment has the same structure with the developer cartridge of the Embodiment 1.

Figure 13:
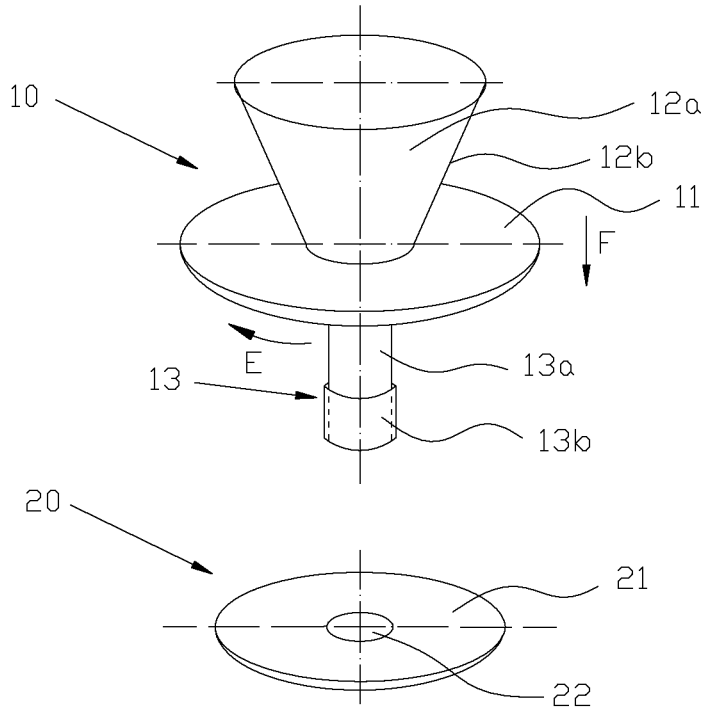
FIG. 13 is a structure diagram of a counting mechanism in the Embodiment 5.
Figure 14:
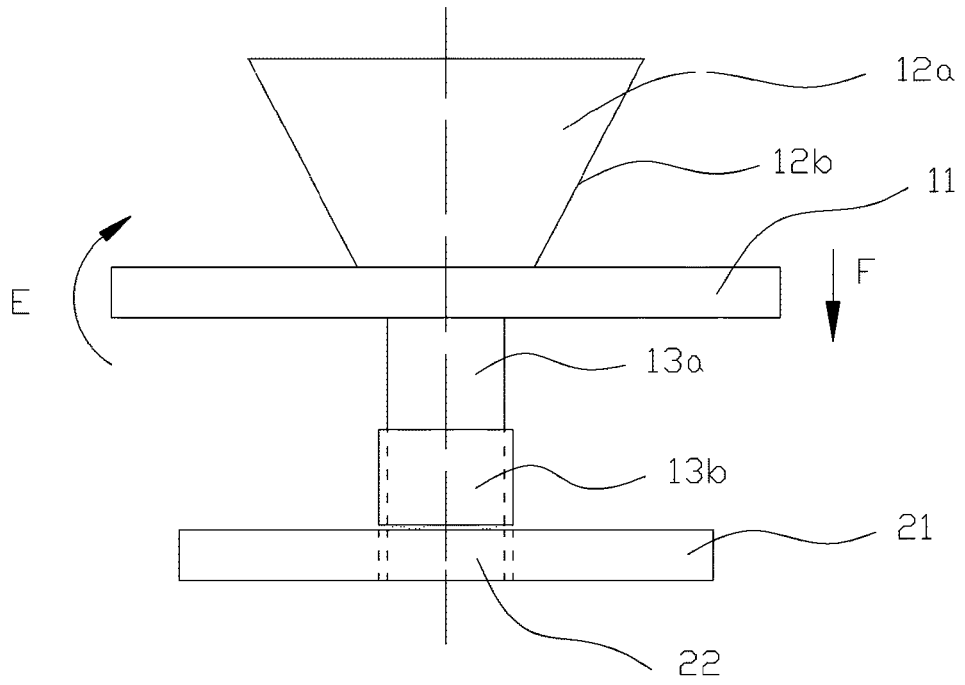
FIGS. 14 and 15 are respectively a schematic diagram of the counting mechanism on the initial state and a schematic diagram of the counting mechanism on the final state in the Embodiment 5.
Figure 15:
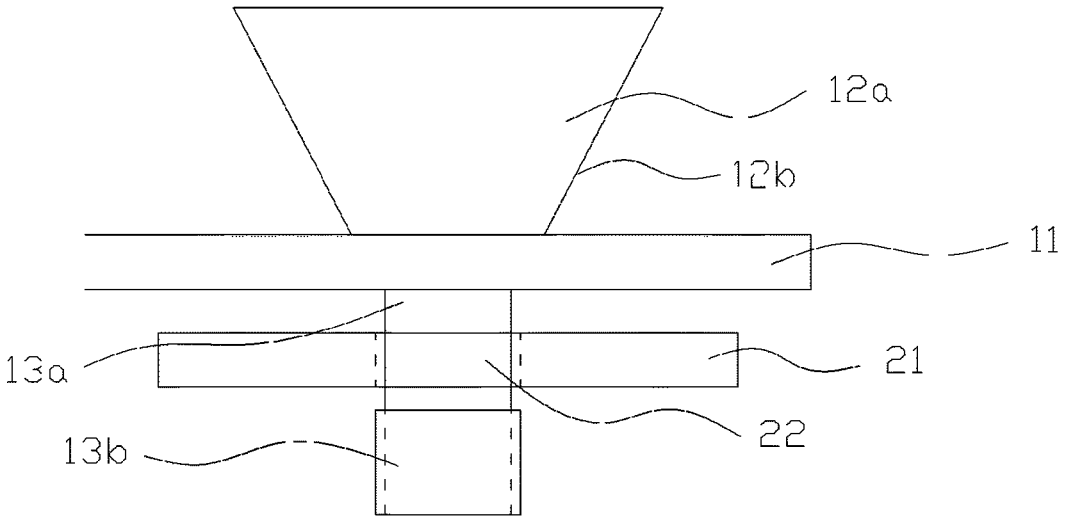

FIGS. 13, 14, and 15 illustrate the Embodiment 5, wherein a protrusion 12a on the counting mechanism of the embodiment has the structure of an inverted truncated cone. When the rotary member 10 is in downward rotation movement, an inclined plane 12b of the protrusion 12a comes in contact with the contact lever 86 on the electronic photographing device, thus the counting function of the developer cartridge is realized; and when the inclined plane 12b is separated from the contact lever 86, the information detection mechanism 81 on the electronic photographing device is not positioned inside the optical sensor as a barrier again, thus the counting function of the electronic photographing device does not work.

Another aspect of the embodiment is that: the protrusion 12a has a structure of a truncated cone, and an inclined plane on the protrusion 12a comes in contact with the contact lever 86 during the upward rotation movement, thus the counting function of the developer cartridge is realized.

Embodiment 6

Unless otherwise specified, the developer cartridge of the embodiment has the same structure with the developer cartridge of the Embodiment 3.

The protrusions of the embodiment have the same structure with those of the Embodiment 5.

Embodiment 7

Unless otherwise specified, the developer cartridge of the embodiment has the same structure with the developer cartridge of the Embodiment 2.

Figure 16:
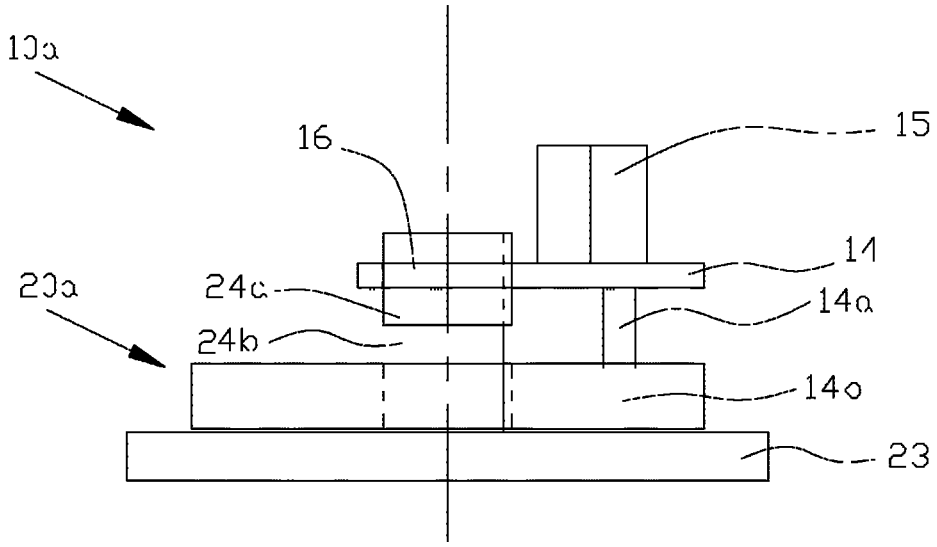
FIG. 16 is a schematic diagram of a counting mechanism on the initial state in the Embodiment 7.

As illustrated in FIG. 16, the hanging wall 23 and the cylinder 24 are arranged on the fixed member 20a which is fixed on the side wall 58 of the toner hopper 55; a first rotary member 14c and a second rotary member 14d are arranged on the rotary member 10a; the first rotary member 14c is provided with a concave hole 14b; a protruded post 14a is arranged on the second rotary member 14d and used with the concave hole 14b; the first rotary member 14c is arranged on an unthreaded portion 24b on the cylinder 24; the second rotary member 14d is also provided with the screwed hole 16 and the protrusions 15; and the screwed hole 16 is engaged with a threaded portion 24a on the cylinder 24.

Figure 17:
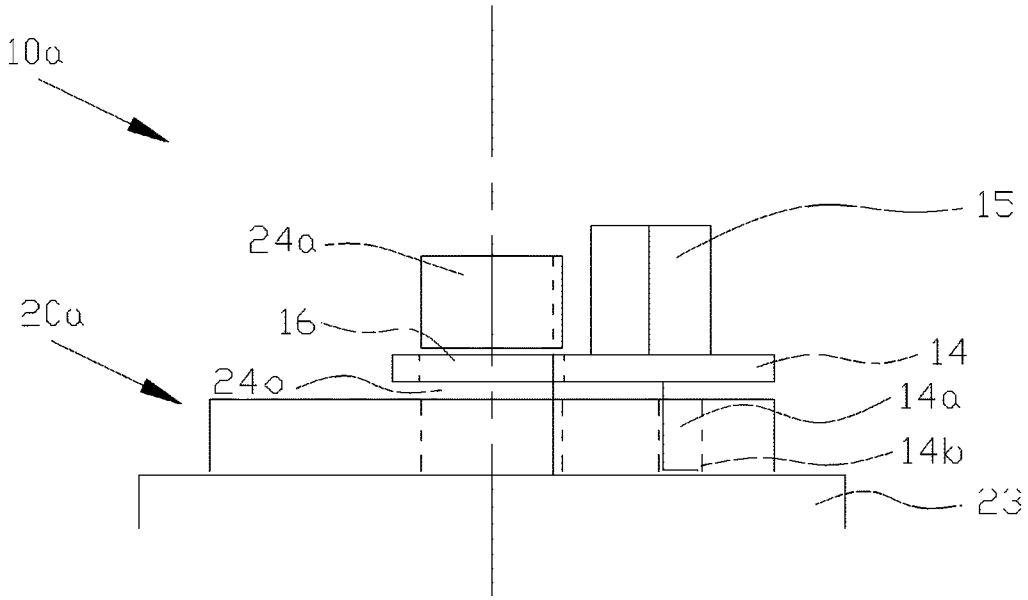
FIG. 17 is a schematic diagram of the counting mechanism on the final state in the Embodiment 7.

During the working process of the developer cartridge, a gear is arranged on the outer circumference of the first rotary member 14c and can receive power from the input gear 67 and keep rotating. In the rotation process of the first rotary member 14c, as the protruded post 14a is used with the concave hole 14b, the second rotary member 14d and the first rotary member 14c are driven to be in synchronous rotation; the second rotary member 14d is engaged with the threaded portion 24a through the screwed hole 16 and moves close to the first rotary member 14c, i.e. from the state as shown in FIG. 16 to the state as shown in FIG. 17.

The first rotary member 14c of the embodiment is a hanging wall.

It is obvious to those having ordinary skill in the art that the counting function of the developer cartridge can also be realized when the protrusions on the counting mechanism come in contact with the contact lever of the information detection mechanism when the rotary member moves away from the fixed member.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A developer cartridge [with a counting mechanism] comprising:

*a counting mechanism;*

*a counting mechanism driving member; and* a cartridge body for accommodating a developer, the counting mechanism and [a] *the* counting mechanism driving member;

wherein the counting mechanism [comprising] *comprises* a protrusion moving under [the] *a* driving action of the counting mechanism driving member from a second position in which the protrusion being not in contact with a contact lever on an electronic photographing device to a first position in which the protrusion being in contact with the contact lever on the electronic photographing device [so as to count the developer cartridge]; and wherein the counting mechanism driving member [driving] *drives* the protrusion to move away from a side wall of the cartridge body in a direction perpendicular to the side wall, *and* the protrusion in the first position is farther away from the side wall than in the second position in the direction perpendicular to the side wall.

2. The developer cartridge according to claim 1, wherein the counting mechanism comprises a rotary member and a fixed member;

wherein the fixed member is fixed on the side wall of the developer cartridge;

wherein the rotary member can rotate relative to the developer cartridge; *and* the protrusion is arranged on a surface of the rotary member [far] away from the fixed member; and wherein the protrusion in the first position is farther away from the fixed member than in the second position in the direction perpendicular to the side wall.

3. The developer cartridge according to claim 2 further comprising a hanging wall also arranged on the rotary member, and a gear [is] arranged on [the] *an* outer circumference of the hanging wall and engaged with the counting mechanism driving member.

4. The developer cartridge according to claim 3, wherein [the] *a* width of the hanging wall is small enough to make the rotary member not rotate when the rotary member is in the first position.

5. The developer cartridge according to claim 3, wherein [the] *a* width of the hanging wall is large enough to make the rotary member keep rotating when the rotary member is in the first position.

6. The developer cartridge according to claim 2 further comprising a cylinder arranged on one of the rotary member [or] *and* the fixed member, and [comprises] *having* a threaded portion and an unthreaded portion; the other one of the rotary member [or] *and* the fixed member [is] *being* provided with a screwed hole corresponding to the cylinder.

7. The developer cartridge according to claim 6, wherein a thread pitch or a plurality of thread pitches are arranged on the threaded portion.

8. The developer cartridge according to claim 2, wherein the rotary member comprises a first rotary member and a second rotary member; the first rotary member is provided with a concave hole; a protruded post is arranged on the second rotary member; and the protruded post is used with the concave hole to drive the second rotary member and the first rotary member to be in synchronous rotation.

9. The developer cartridge according to claim 8, *wherein:* when the protrusion on the rotary member is in the second position, the threaded portion on the rotary member is not engaged with or partially engaged with the screwed hole;

when the protrusion on the rotary member is in the first position, the threaded portion is not engaged with the screwed hole [again], and the unthreaded portion comes in contact with the screwed hole.

10. The developer cartridge according to claim 2, wherein the protrusion [is] *includes a* truncated cone or inverted truncated cones, and [come] *comes* in contact with [the] *a* contact lever *on an electronic photographing device* when the rotary member [move] *moves* away from the side wall of the developer cartridge.

*11. A developer cartridge, comprising*

*a counting mechanism;*

*a counting mechanism driving member; and*

*a cartridge body for accommodating a developer, the counting mechanism, and the counting mechanism driving member,*

*wherein the counting mechanism comprises a rotary member and a fixed member;*

*wherein the fixed member is fixed on a side wall of the developer cartridge;*

*wherein the counting mechanism further comprises a protrusion arranged on a surface of the rotary member away from the fixed member; and*

*wherein, being driven by the counting mechanism driving member, the rotary member rotates relative to the developer cartridge to engage and disengage the fixed member to start and stop a counting function of the counting mechanism.*

*12. The developer cartridge according to claim 11, further comprising a hanging wall also arranged on the rotary member; and a gear arranged on an outer circumference of the hanging wall and engaged with the counting mechanism driving member.*

*13. The developer cartridge according to claim 12, further comprising:*

*a cylinder arranged on one of the rotary member and the fixed member, and having a threaded portion and an unthreaded portion; the other one of the rotary member and the fixed member being provided with a screwed hole corresponding to the cylinder.*

*14. The developer cartridge according to claim 13, wherein a thread pitch or a plurality of thread pitches are arranged on the threaded portion.*

*15. The developer cartridge according to claim 12, wherein the rotary member comprises a first rotary member and a second rotary member; the first rotary member is provided with a concave hole; a protruded post is arranged on the second rotary member; and the protruded post is used with the concave hole to drive the second rotary member and the first rotary member to be in synchronous rotation.*

*16. The developer cartridge according to claim 11, wherein:*

*the protrusion moves from a second position in which the protrusion being not in contact with a contact lever on an electronic photographing device to a first position in which the protrusion being in contact with the contact lever on the electronic photographing device so as to count the developer cartridge; and*

*the counting mechanism driving member drives the protrusion to move away from a side wall of the cartridge body in a direction perpendicular to the side wall, and the protrusion in the first position is farther away from the side wall than in the second position in the direction perpendicular to the side wall.*

*17. The developer cartridge according to claim 16, wherein:*

*the protrusion in the first position is farther away from the fixed member than in the second position in the direction perpendicular to the side wall.*

* * * * *